US008578424B2

(12) United States Patent
Kim et al.

(10) Patent No.: US 8,578,424 B2
(45) Date of Patent: Nov. 5, 2013

(54) DIGITAL BROADCASTING SYSTEM AND METHOD FOR TRANSMITTING AND RECEIVING ELECTRONIC SERVICE GUIDE DATA IN DIGITAL BROADCASTING SYSTEM

(75) Inventors: Sun-Mi Kim, Seoul (KR); Hyun-Chul Kim, Suwon-si (KR); Young-Jip Kim, Suwon-si (KR); Byoung-Dai Lee, Seongnam-si (KR); Young-Kyu Bae, Bucheon-si (KR)

(73) Assignee: Samsung Electronics Co., Ltd (KR)

( * ) Notice: Subject to any disclaimer, the term of this patent is extended or adjusted under 35 U.S.C. 154(b) by 377 days.

(21) Appl. No.: 12/246,094

(22) Filed: Oct. 6, 2008

(65) Prior Publication Data

US 2009/0100471 A1    Apr. 16, 2009

(30) Foreign Application Priority Data

Oct. 5, 2007    (KR) .................. 10-2007-0100491

(51) Int. Cl.
G06F 13/00    (2006.01)
G06F 3/00    (2006.01)
H04N 5/445    (2011.01)

(52) U.S. Cl.
USPC .............................. 725/54; 725/39

(58) Field of Classification Search
USPC ........................................ 725/39, 54
See application file for complete search history.

(56) References Cited

U.S. PATENT DOCUMENTS

| 2005/0044564 | A1* | 2/2005 | Stopniewicz et al. | 725/37 |
| 2005/0055722 | A1* | 3/2005 | Lym | 725/80 |
| 2005/0172315 | A1* | 8/2005 | Chen | 725/39 |
| 2006/0184965 | A1* | 8/2006 | Lee et al. | 725/39 |
| 2006/0225093 | A1* | 10/2006 | Huttunen et al. | 725/39 |
| 2007/0107013 | A1* | 5/2007 | Seppala et al. | 725/39 |
| 2007/0123244 | A1* | 5/2007 | Paila | 455/419 |

FOREIGN PATENT DOCUMENTS

| EP | 1 753 166 | 2/2007 |
| EP | 1 755 274 | 2/2007 |
| WO | WO 2007/042907 | 4/2007 |

OTHER PUBLICATIONS

Open Mobile Alliance: "Service Guide for Mobile Broadcast Services Candidate Version 1.0", XP002641545, Sep. 25, 2007.
DVB Organization: "39 ESG Datamodel", XP017804889, Sep. 24, 2004.
DVB Organization: "IP Datacast over DVB-H: Electronic Service Guide (ESG)", XP017805566, Apr. 25, 2005.
DVB Organization: "ESG Datamodel Comparison between OMA BCAST and DVB CBMS", XP017804942, Nov. 27, 2005.

* cited by examiner

Primary Examiner — Mulugeta Mengesha
(74) Attorney, Agent, or Firm — The Farrell Law Firm, P.C.

(57) ABSTRACT

Disclosed are a digital broadcasting system and a method for transmitting and receiving electronic service guide data in a digital broadcasting system, which communicates applications capable of executing content files downloaded through a file download service. The digital broadcasting system includes a digital broadcasting transmitter for broadcasting Electronic Service Guide (ESG) data which includes application information corresponding to respective content files, and a digital broadcasting receiver for receiving the broadcasted ESG data and executing applications corresponding to the respective content files by using the application information included in the ESG data.

8 Claims, 5 Drawing Sheets

DIGITAL BROADCASTING SYSTEM AND METHOD FOR TRANSMITTING AND RECEIVING ELECTRONIC SERVICE GUIDE DATA IN DIGITAL BROADCASTING SYSTEM

PRIORITY

This application claims priority under 35 U.S.C. §119(a) to an application entitled "Digital Broadcasting System and Method for Transmitting and Receiving Electronic Service Guide Data in Digital Broadcasting System" filed in the Korean Industrial Property Office on Oct. 5, 2007 and assigned Ser. No. 2007-100491, the contents of which are incorporated herein by reference.

BACKGROUND OF THE INVENTION

1. Field of the Invention

The present invention relates generally to a digital broadcasting system and a method for transmitting and receiving electronic service guide data in a digital broadcasting system, and more particularly to such a system which communicates applications capable of executing content files downloaded through a file download service.

2. Description of the Related Art

Transmission technologies for digital broadcasting are for various broadcasting systems, such as a Digital Audio Broadcasting (DAB), a Digital Video Broadcasting (DVB), and a Digital Multimedia Broadcasting (DMB). As an example, the DVB system, which is a European Digital Video Broadcasting technology, is a transmission standard that supports mobile and digital multimedia services for mobile and handheld devices, as well as existing digital broadcastings.

In the DVB system, it is possible to multiplex and simultaneously transmit Moving Picture Experts Group-2 (MPEG2) Transport Stream (TS)-based data and Internet Protocol (IP)-based data stream, and it is also possible to multiplex and transmit several services into one IP stream. A receiver receives data of the IP stream from a transmitter, demultiplexes the data into individual services, decodes TS packets of a desired service and outputs the decoded data onto a screen for the user. At this time, the user needs to know which various services are provided in the DVB system and which contents the respective services include.

In the DVB system, Electronic Service Guide (ESG) is used for communicating information on respective services. The ESG provides users with various services, such as communicating information on current programs and information on programs by channel or time, and showing purchase information on corresponding programs to users. This ESG has a purpose of allowing users to select various services and related contents. In order to provide the ESG service in digital broadcast standard, ESG data models based on XML (eXtensible Markup Language) have been defined in ETSI (European Telecommunications Standards Institute). The ESG data models are easy to flexibly extend in DMB receiving terminals.

FIG. 1 illustrates a configuration of conventional ESG data.

The ESG data models defined in ETSI are classified into XML fragments, such as Service, Access, Schedule, Contents, PurchaseItem, PurchaseData and PurchaseChannel.

The service fragment defines information related to respective channels and the schedule fragment defines schedule information on contents to be transmitted to specified channels. The contents fragment includes information on contents to be transmitted to the respective channels. The access fragment defines information on channels to which specified services are transmitted, thereby allowing the receiver to find and provide for specified services when the user selects them.

The PurchaseItem includes information on service bundles, and is connected with the PurchaseData and the PurchaseChannel so as to transfer purchase information on services. The fragments have connection chains between them to form the overall ESG data.

There may be other fragments included in the XML fragments, such as PreviewData, Interactivity Data, Service Guide Delivery Descriptor and Session Description.

Meanwhile, an Open Mobile Alliance (OMA) broadcasting service defines a file download service, and provides one channel as a file download only channel. The file download service indicates that when the ServiceType in the service fragment of the digital broadcasting is defined as the file download service, the file downloads are provided from the corresponding channel to the receiver.

However, neither extensions nor types of download files are defined in the digital broadcast standard. Thus, it cannot be recognized which applications are suitable for the downloaded files, but it should be analogized only from file names. It is difficult to accurately identify the suitable application solely from a MIME (Multi-purpose Internet Mail Extensions) type presented in the digital broadcast standard or the file extensions. When the receiver can't connect the download files to correct applications, the user cannot receive desired services.

Hence, the transmitter should specify which applications are suitable for the download files, and the receiver should execute the files by using the specified applications, in order to provide the user with stable services.

The digital broadcasting file download service is provided for more than allowing files to be received through the broadcasting channel or an interaction channel and storing the downloaded files. By providing additional information related to the digital broadcasting service as a file unit or providing additional services using the file download, the file download service in the digital broadcast standard provides the user with differentiated broadcasting services. In order to allow the user to conveniently and reliably use such services, the use of the downloaded files should be clearly described so that the files are correctly executed.

In the current digital broadcast standard, it is not specified how to identify applications for the downloaded files, and it is not described how to use the MIME type or the extension of files on the digital broadcast standard. So, there is a need for directions on how to service the download files.

In addition, although the file type can be recognized from the MIME type or name of the files, these are insufficient to specify programs connected to services in the file download service since files of the same type may be executed in different services.

If, for example, an audio file is downloaded, the file can be recognized as being an audio file just from the MIME type or name thereof. However, it is difficult to know whether the file is merely provided as an additional mp3 file or is a file for a ringtone service. Therefore, there is a need to specify applications for the files in the file download service.

SUMMARY OF THE INVENTION

Accordingly, the present invention has been made to solve the above-mentioned problems occurring in the prior art, and the present invention provides a digital broadcasting system and a method for transmitting and receiving electronic service guide data in a digital broadcasting system, which communicates applications capable of executing downloaded content files.

In accordance with the present invention, there is provided a digital broadcasting system including a digital broadcasting transmitter for broadcasting ESG data which includes application information corresponding to respective content files, and a digital broadcasting receiver for receiving the broadcasted ESG data and executing applications corresponding to the respective content files by using the application information included in the ESG data.

In accordance with the present invention, there is provided a method for transmitting ESG data in a digital broadcasting transmitter of a digital broadcasting system, including generating ESG data which includes application information corresponding to respective content files, and broadcasting the generated ESG data including the application information.

In accordance with the present invention, there is provided a method for receiving ESG data in a digital broadcasting receiver of a digital broadcasting system, including receiving ESG data which includes application information corresponding to respective content files, extracting the application information from the received ESG data, and storing the extracting application information, downloading, when receiving a selection input from the user for selecting a file download service, a corresponding content file, deciding an application capable of executing the downloaded content file using application information, corresponding to the downloaded content file, of the stored application information, determining whether the decided application is an executable application, and when the decided application is an executable application, executing the downloaded content file with the application.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description of the present invention, a detailed description of known functions and configurations incorporated herein will be omitted for the sake of clarity and conciseness.

A digital broadcasting system in accordance with the present invention includes a digital broadcasting transmitter 10 for broadcasting electronic service guide data (hereinafter ESG data) and a digital broadcasting receiver 30 for receiving the broadcasted ESG data. The digital broadcasting transmitter 10 generates and transmits the ESG data in XML format.

The digital broadcasting transmitter 10 records application information on applications capable of executing content files in a service fragment of the ESG data, and then broadcasts the ESG data, so that the digital broadcasting receiver 30 can be informed of the applications capable of executing the downloaded content files through the application information.

Figure 1:
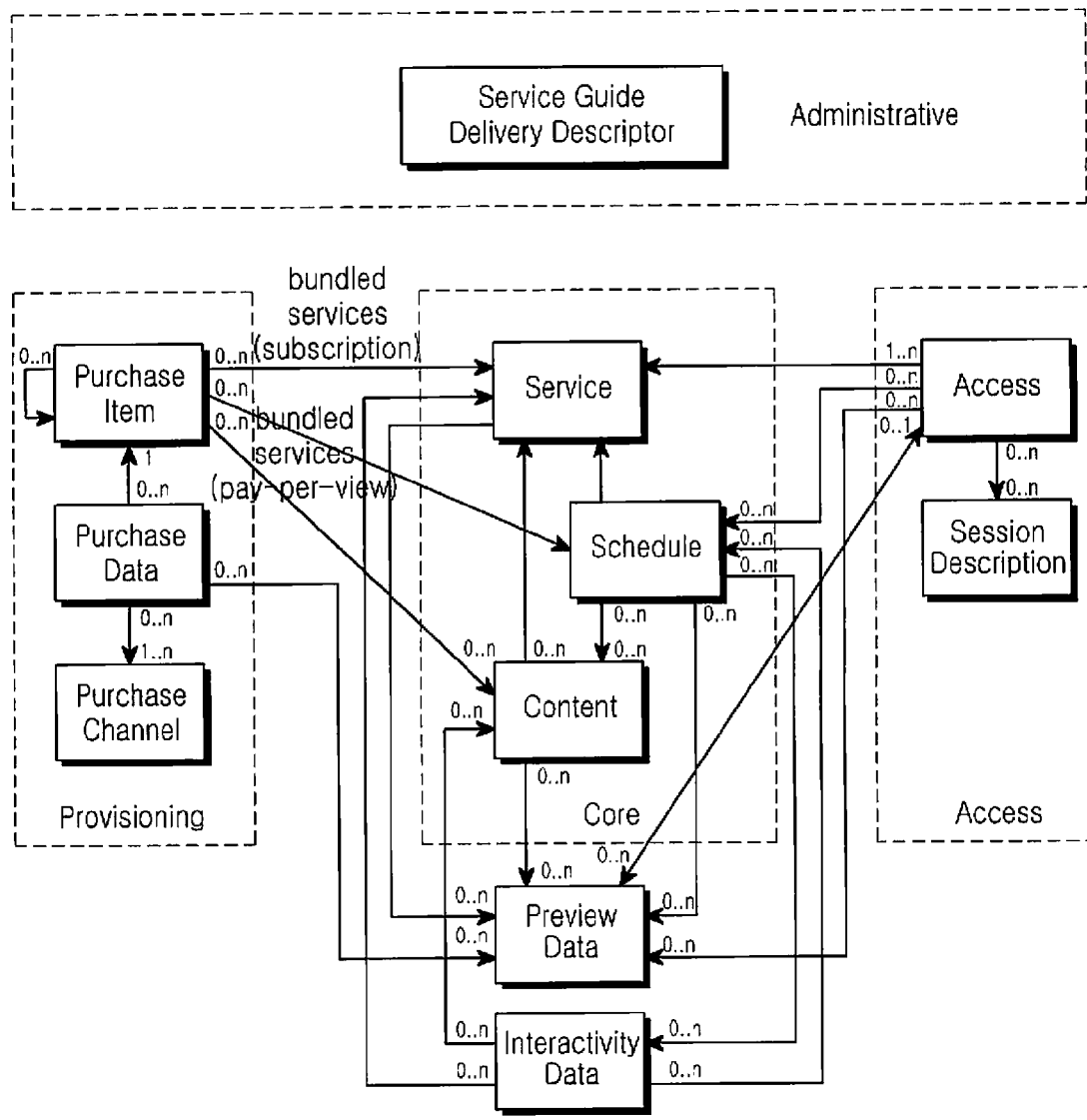
FIG. 1 is a block diagram illustrating a configuration of conventional ESG data.
Figure 2:
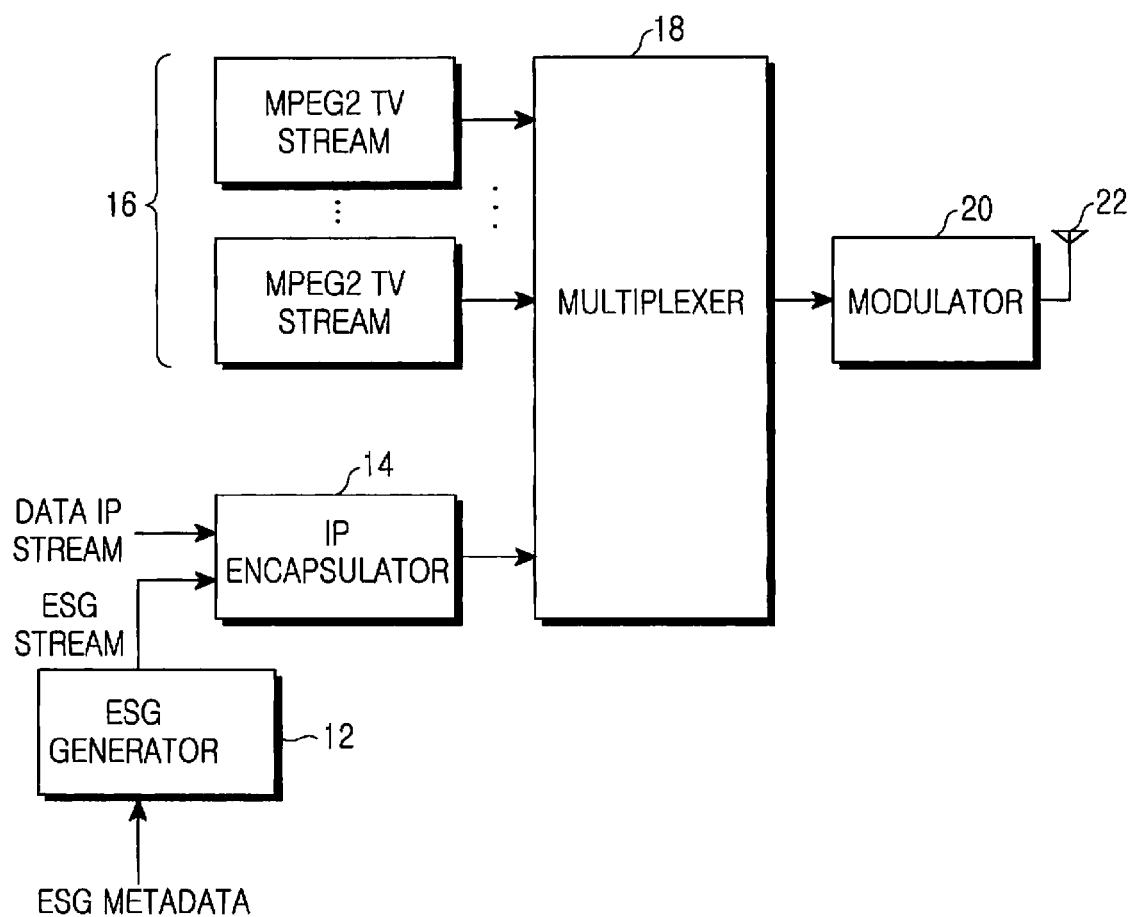
FIG. 2 is a block diagram illustrating a digital broadcasting transmitter in a digital broadcasting system according to the present invention.

FIG. 2 is a block diagram illustrating the digital broadcasting transmitter in a digital broadcasting system according to the present invention.

The digital broadcasting transmitter 10 includes an ESG generator 12, an IP encapsulator 14, a multiplexer 18, a modulator 20 and an antenna 22. The ESG generator 12 receives ESG metadata for a MPEG 2 TeleVision (TV) stream and a data Internet Protocol (IP) stream, and generates the ESG data using the ESG metadata. The ESG generator 12 encodes respective fragments and generates at least one ESG IP stream.

The ESG generator 12 is operative to record the application information on applications corresponding to respective content files in the service fragment of fragments of the ESG data. The digital broadcasting receiver 30 needs the applications capable of executing the respective content files in order to execute the content files received from a channel over the digital broadcasting. The ESG generator 12 records the application information corresponding to the respective content files in the service fragment of the ESG data when generating the ESG data, thereby allowing the digital broadcasting receiver 30 to execute the content files with the appropriate applications.

The IP encapsulator 14 receives and encapsulates the data IP stream and the ESG IP stream output from the ESG generator 12. The multiplexer 18 receives and multiplexes the MPEG2 TV stream and data output from the IP encapsulator 14. The modulator 20 Orthogonal Frequency Division Multiplex (OFDM)-modulates a Transport Stream (TS) which is data modulated by the multiplexer 18. The antenna 22 broadcasts the ESG data, which is OFDM-modulated data.

Figure 3:
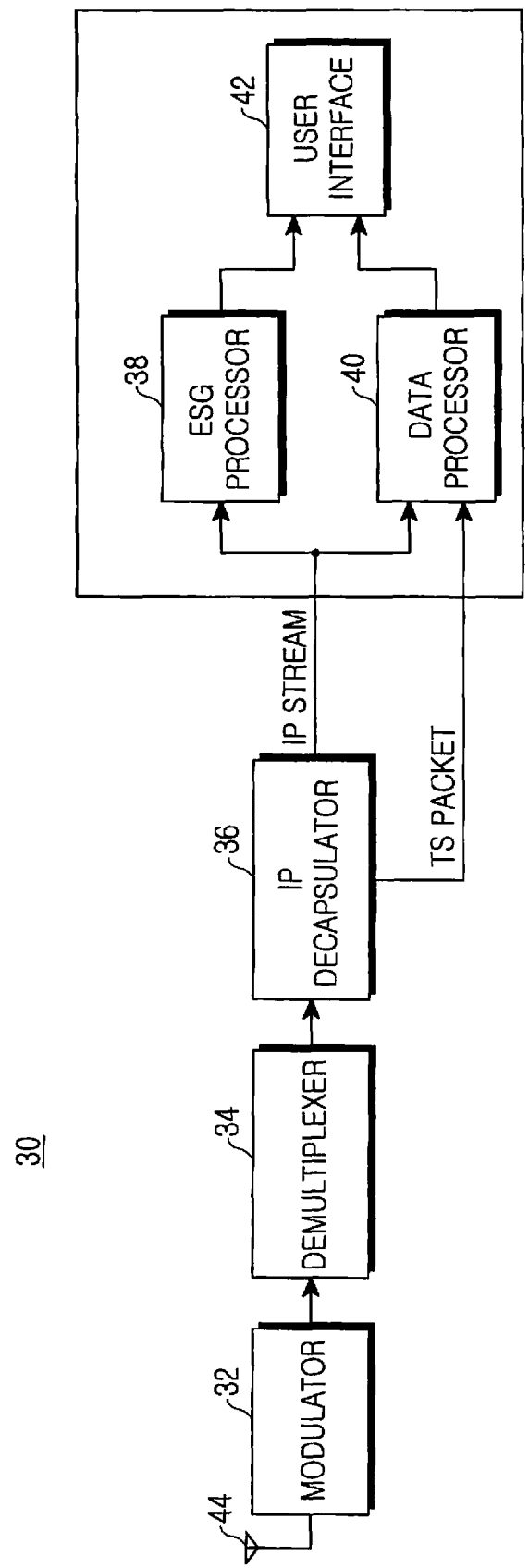
FIG. 3 is a block diagram of a digital broadcasting receiver in a digital broadcasting system according to the present invention.

FIG. 3 is a block diagram of the digital broadcasting receiver in a digital broadcasting system according to the present invention.

The digital broadcasting receiver 30 receives, through a user interface 42 mentioned below, a user input for selecting a file download service from the selected channel, and downloads at least one content file from the channel. It is referred to as the file download service that downloads at least one content file when receiving a user input.

The digital broadcasting receiver 30 for receiving the file download service includes an antenna 44, a modulator 32, a demultiplexer 34, an IP decapsulator 36, an ESG processor 38, a data processor 40 and the user interface 42.

The antenna 44 receives the ESG data broadcasted from the digital broadcasting transmitter 10. The modulator 32 OFDM-demodulates the ESG data modulated by the modulator 20 of the digital broadcasting transmitter 10.

The demultiplexer 34 receives and demultiplexes the ESG data OFDM-demodulated in the modulator 32. The IP decapsulator 36 sorts data output from the demultiplexer 34 into an encapsulated IP stream and a MPEG2 TS packet stream. The TS packet stream is input to the data processor 40, not through the ESG processor 38. When receiving the TS packet stream, the data processor 40 performs a series of operations, such as MPEG decoding, in order to display a service corresponding to the TS packet stream. The IP decapsulator 36 restores the encapsulated IP stream to an IP stream.

The IP stream is divided into an ESG stream and a data stream, which are input to the ESG processor 38 and the data processor 40, respectively. The ESG processor 38 analyzes the ESG stream, obtains ESG data including a plurality of fragments, and decodes the ESG data.

If a content file is a file downloaded through the file download service and includes information on applications corresponding thereto, the ESG processor 38 according to the present invention decides an application for outputting the downloaded file.

The user interface 42 outputs the ESG data decoded by the ESG processor 38 through an ESG standard browser, for example. Here, the user interface 42 may execute the application decided by the ESG processor 38 to output the ESG data. The user interface according to the present invention may output a channel list of the ESG data and receive a user input selecting one of channels of the output channel list.

Figure 4:
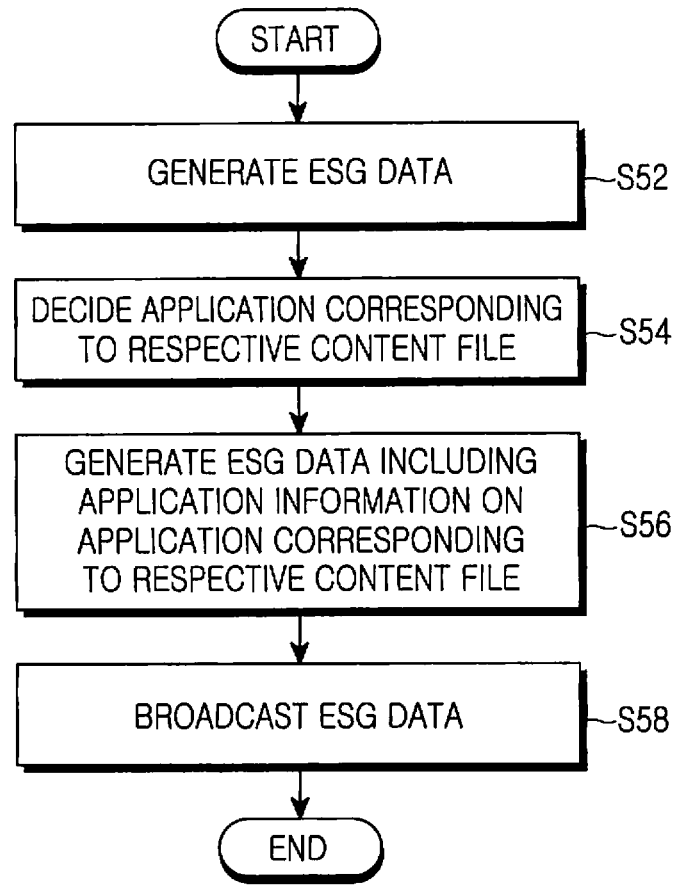
FIG. 4 illustrates a method for transmitting ESG data in a digital broadcasting transmitter of a digital broadcasting system in accordance with the present invention.

FIG. 4 illustrates a method for transmitting ESG data in the digital broadcasting transmitter of the digital broadcasting system in accordance with the present invention.

The digital broadcasting transmitter 10 generates ESG data (S52). The ESG generator 12 decides applications corresponding to respective content files (S54). The ESG generator 12 generates ESG data including application information on the applications corresponding the respective content files (S56). The digital broadcasting transmitter 10 broadcasts the ESG data generated at step 56 (S58).

The method for transmitting the ESG data in using the digital broadcasting transmitter 10 will now be described with reference to Tables 1 to 3 below.

The digital broadcasting transmitter 10 may add application information to ESG data as mentioned below. Table 1 represents an example where an application-type element is added to a service-type element in a service fragment schema.

TABLE 1

```
<xs:element name="Content" type="ContentType"/>
<!-- Service fragment -->
<xs:complexType name="ContentType">
<xs:sequence>
<xs:element name="ServiceReference" minOccurs="0"
maxOccurs="unbounded">
<xs:complexType>
<xs:attribute name="idRef" type="xs:anyURI" use="required"/>
<xs:attribute name="weight" type="xs:unsignedShort" use="optional"
default="65535"/>
</xs:complexType>
</xs:element>
<xs:element name="ProtectionKeyID" type="ProtectionKeyIDType"
minOccurs="0" maxOccurs="unbounded"/>
<!-- Start of program guide information -->
<xs:element name="Name" type="LanguageString" maxOccurs="unbounded"/>
<xs:element name="Description" type="LanguageString" minOccurs="0"
maxOccurs="unbounded"/>
<xs:element name="StartTime" type="xs:dateTime" minOccurs="0"/>
<xs:element name="EndTime" type="xs:dateTime" minOccurs="0"/>
<xs:element name="AudioLanguage" type="AudioOrTextLanguageType"
minOccurs="0" maxOccurs="unbounded"/>
<xs:element name="TextLanguage" type="AudioOrTextLanguageType"
minOccurs="0" maxOccurs="unbounded"/>
<xs:element name="Length" type="xs:duration" minOccurs="0"/>
<xs:element name="ParentalRating" type="ParentalRatingType" minOccurs="0"
maxOccurs="unbounded"/>
<xs:element name="TargetUserProfile" type="TargetUserProfileType"
minOccurs="0" maxOccurs="unbounded"/>
<xs:element name="Genre" type="GenreType" minOccurs="0"
maxOccurs="unbounded"/>
<xs:element name="TermsOfUse" type="TermsOfUseType" minOccurs="0"
maxOccurs="unbounded"/>
<xs:element name="applicationType" type="ApplicationTypeRangeType"
use="optional"/>
<xs:element name="Extension" type="ExtensionType" minOccurs="0"
maxOccurs="unbounded"/>
<!-- End of program guide information -->
<xs:element name="PreviewDataReference" type="PreviewDataReferenceType"
minOccurs="0" maxOccurs="unbounded"/>
<xs:element name="BroadcastArea" type="BroadcastAreaType"
minOccurs="0"/>
<xs:element name="PrivateExt" type="PrivateExtType" minOccurs="0"/>
</xs:sequence>
<xs:attribute name="id" type="xs:anyURI" use="required"/>
<xs:attribute name="version" type="xs:unsignedInt" use="required"/>
<xs:attribute name="validFrom" type="xs:unsignedInt" use="optional"/>
<xs:attribute name-"validTo" type="xs:unsignedInt" use="optional"/>
<xs:attribute name="globalContentID" type="xs:anyURI" use="optional"/>
<xs:attribute name="emergency" type="xs:boolean" use="optional"
default="false"/>
<xs:attribute name="serviceContentProtection" type="xs:boolean" use="optional"
default="false"/>
<xs:attribute name="baseCID" type="xs:string" use="optional"/>
</xs:complexType>
```

In Table 1, the digital broadcasting transmitter 10 denotes application information for a content file, which is intended to be provided to the digital broadcasting receiver 30 through the file download service, as "<xs:element"'name="applicationType" type="ApplicationTypeRangeType" use="optional"/>.

In this manner, the digital broadcasting transmitter 10 may add a data field, in which the applications corresponding to the content files can be recorded, to the service fragment. The record of the applications corresponding to the content file in the data field added to the service fragment is the application information.

The digital broadcasting receiver 30 can easily recognize the applications for a downloaded file by analyzing the ESG data as denoted in Table 1. In Table 1, the application element is denoted in bold as "optional". The "optional" term indicates that the element is included when the element is necessarily needed; otherwise, it is not included.

Table 2 represents application information defined as "ApplicationTypeRangeType" and "ApplicationRangeType" of the service fragment schema.

TABLE 2

```
<!--
Allowed values are:
0 - unspecified
1 - Basic TV
2 - Basic Radio
4 - Cachecast
5 - File download services
6 - Software management services
7 Notification
8 Service Guide
9 - Terminal Provisioning services
10 - 127 reserved for future use
128 -255 reserved for proprietary use
-->
<xs:simpleType name="ServiceTypeRangeType">
<xs:union memberTypes="ServiceTypeLRType ServiceTypeHRType"/>
<xs:attribute name="applicationType"
type="xs:ApplicationTypeRangeType" use="optional"/>
</xs:simpleType>
<xs:simpleType name="ServiceTypeLRType">
<xs:restriction base="xs:unsignedByte">
<xs:minInclusive value="0"/>
<xs:maxInclusive value="9"/>
</xs:restriction>
</xs:simpleType>
<xs:simpleType name="ServiceTypeHRType">
<xs:restriction base="xs:unsignedByte">
<xs:minInclusive value="128"/>
<xs:maxInclusive value="255"/>
</xs:restriction>
</xs:simpleType>
```

Referring to Table 2, the digital broadcasting transmitter 10 denotes the application information by recording "<xs:attribute name="applicationType" type="xs:ApplicationTypeRangeType" use="optional"/> in the service fragment. In Table 2, an application type is configured as "ApplicationTypeRangeType" to represent that there is at least one application which can execute the content file.

Table 3 below defines "ApplicationTypeRangeType" of Table 2 in detail.

TABLE 3

```
<!--
Allowed values are:
0 - unspecified
1 - mp3(basit audio file) app.
2 - ring tone app.
```

TABLE 3-continued

```
4 - game app.
5 - image app.
6 - 127 reserved for future use
128 -255 reserved for proprietary use
-->
<xs:simpleType name="ApplicationTypeRangeType">
<xs:union memberTypes="ApplicationTypeLRType
ApplicationTypeHRType"/>
</xs:simpleType>
<xs:simpleType name="ApplicationTypeLRTypee">
<xs:restriction base="xs:unsignedByte">
<xs:minInclusive value="0"/>
<xs:maxInclusive value="5"/>
</xs:restriction>
</xs:simpleType>
<xs:simpleType name="ApplicationTypeHRType">
<xs:restriction base="xs:unsignedByte">
<xs:minInclusive value="128"/>
<xs:maxInclusive value="255"/>
</xs:restriction>
</xs:simpleType>
```

Referring to Table 3, an MP3 app. (i.e. an mp3 application), ring tone app., game app., image app., are denoted as the applications capable of executing the content file. Such applications may be added or modified by one skilled in the art embodying the present invention.

The digital broadcasting transmitter 10 performs the recording of the application information by additionally defining the attributes of the application type in the service fragment of the ESG data, as defined in Tables 2 and 3, and transmits it to the digital broadcasting receiver 30.

The digital broadcasting receiver 30 analyzes the ESG data as denoted in Tables 2 and 3 and stores the application information on the respective content files. The digital broadcasting receiver 30 may store the application information in an existing ESG database (not shown). When the digital broadcasting receiver 30 receives a user input, from the user, for requesting the file download service, it checks application types recoded in the service fragment of the ESG data and executes the content file by using a corresponding application.

With reference to Table 3, it is supposed that the digital broadcasting receiver 30 is downloading an audio file and an image file from a channel selected by the user. If types of the audio file and image file are a 'game app.', then the digital broadcasting receiver 30 stores the fact that the audio file and image file correspond to the game application in the ESG database, and executes the game application to output the audio file and image file on the user interface 42.

Figure 5:
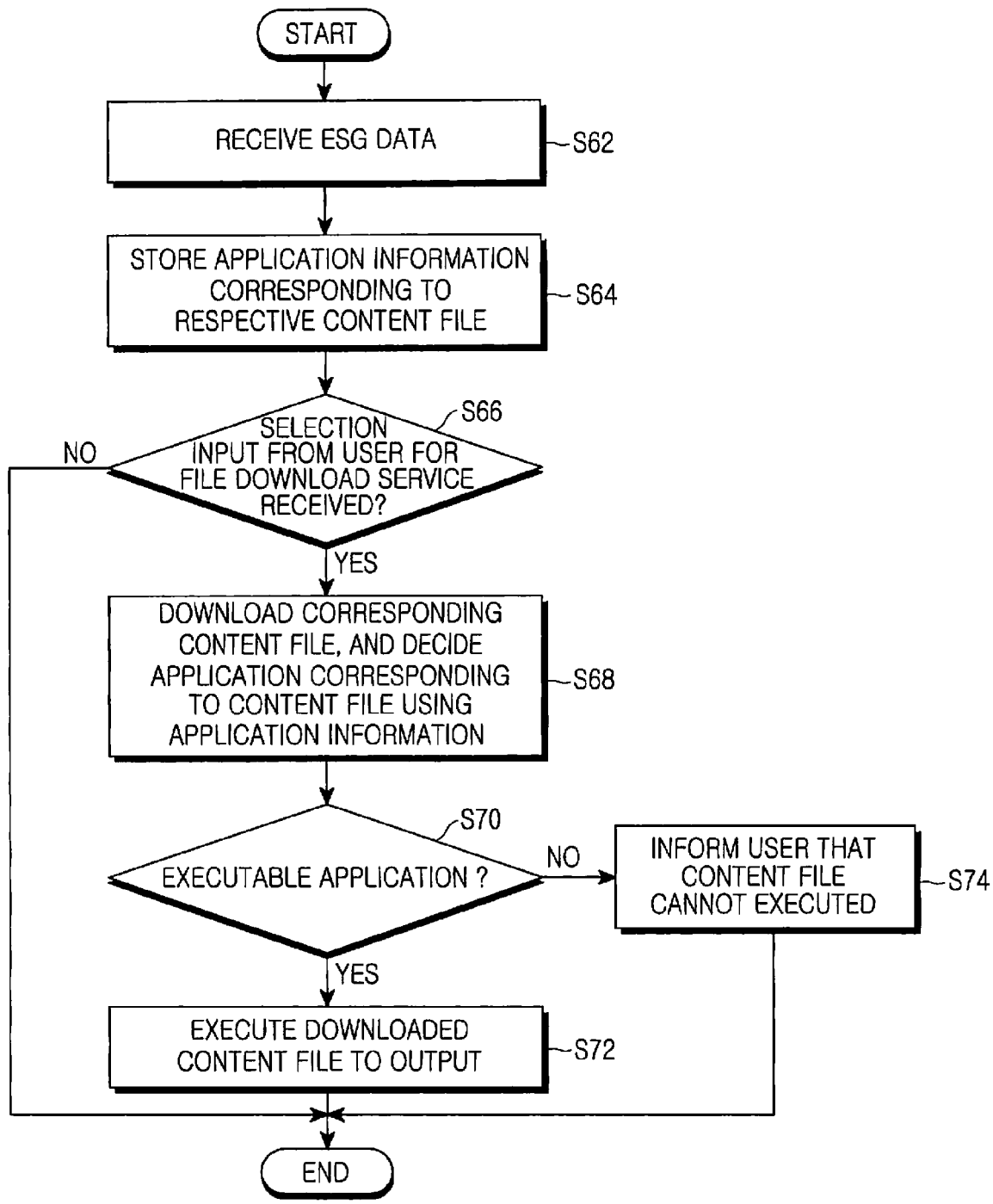
FIG. 5 illustrates a method for receiving ESG data in a digital broadcasting receiver of a digital broadcasting system in accordance with the present invention.

FIG. 5 illustrate as a method for receiving ESG data in the digital broadcasting receiver of the digital broadcasting system in accordance with the present invention.

The antenna 44 receives ESG data that includes application information corresponding respective content files (S62). The ESG processor 38 stores the application information corresponding to the respective content files (S64). The ESG processor 38 may extract and store the application information included in the ESG data.

In this embodiment, the digital broadcasting receiver 30 may include an ESG database which is operative to store only the application information corresponding to the respective content files. The digital broadcasting receiver 30 may extract only the application information as receiving the ESG data. In addition, the digital broadcasting receiver 30 previously stores the extracted application information in the ESG database, and when it receives a selection input from the user for selecting the file download service to download a content file, it receives the selected content file at that time.

The digital broadcasting receiver 30 extracts the application information corresponding to the corresponding content file from the ESG database at the same time when downloading the selected content file, whereby it can recognize the application information on the applications capable of executing the content files.

The digital broadcasting receiver 30 determines whether the user interface 42 receives a selection input from the user for selecting the file download service (S66).

When the selection input for the file download service is received (S66:YES), the digital broadcasting receiver 30 downloads the corresponding content file and decides an application corresponding to the content file (S68).

The digital broadcasting receiver 30 determines whether the application decided at step S68 is an executable application (S70). When the application is executable (S70:YES), the digital broadcasting receiver 30 executes and thus outputs the downloaded content file (S72). When the application is not executable (S70:NO), the digital broadcasting receiver 30 informs the user of the fact that it cannot execute the content file (S74).

As a result of the determination of step S66, when the digital broadcasting receiver 30 does not receive any selection input from the user for the file download service (S66:NO), it does not download any content file, and thus, it does not perform any operation related to the download.

According to the present invention, there is provided a digital broadcasting system and method for transmitting and receiving ESG data in the digital broadcasting system, which makes it possible to know application(s) capable of executing downloaded content files.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A digital broadcasting receiver comprising:
   a receiver for receiving Electronic Service Guide (ESG) data which includes application information corresponding to respective content files from a digital broadcasting transmitter, wherein the application information includes information about applications capable of executing the respective content files; and
   a processor for storing the broadcasted ESG data that includes application information corresponding to respective content files, receiving a selection input from a user for selecting a file download service, downloading a content file corresponding to the selected file download service, and executing the downloaded content file with application information corresponding thereto, using application information corresponding to the downloaded content file of the application information included in the stored ESG data.

2. The digital broadcasting receiver as claimed in claim 1, wherein the digital broadcasting transmitter records the application information in a service fragment of the ESG data.

3. The digital broadcasting receiver as claimed in claim 2, wherein the digital broadcasting transmitter adds an application attribute field to the service fragment, and records the application information corresponding to the respective content files in the added application attribute field.

4. A method for transmitting Electronic Service Guide (ESG) data in a digital broadcasting transmitter of a digital broadcasting system, the method comprising the steps of:
   generating ESG data which includes application information corresponding to respective content files, wherein the application information includes information about applications capable of executing the respective content files;
   broadcasting the generated ESG data including the application information to a digital broadcasting receiver;
   storing the broadcasted ESG data which includes application information corresponding to respective content files;
   configuring a corresponding content file for download, when a selection input is received from a user for selecting a file download service at the digital broadcasting receiver: and
   transmitting the corresponding content file to the digital broadcasting receiver, wherein the transmitted content file is executable with application information corresponding thereto, using application information corresponding to the transmitted content file of the application information included in the ESG data stored at the digital broadcasting receiver.

5. The method for transmitting ESG data as claimed in claim 4, wherein the application information is recorded in a service fragment of the ESG data.

6. The method for transmitting ESG data as claimed in claim 5, wherein the recording of the application information further comprises:
   adding an application attribute field to the service fragment; and
   recording the application information corresponding to the respective content files.

7. A method for receiving Electronic Service Guide (ESG) data in a digital broadcasting receiver of a digital broadcasting system, the method comprising the steps of:
   receiving ESG data which includes application information corresponding to respective content files, extracting the application information from the received ESG data, and storing the extracting application information,
   wherein the application information includes information about applications capable of executing the respective content files;
   downloading, when receiving a selection input from the user for selecting a file download service, a corresponding content file;
   deciding an application capable of outputting the downloaded content file using application information, corresponding to the downloaded content file, of the stored application information;
   determining whether the decided application is an executable application information; and
   when the decided application is an executable application, outputting the downloaded content file by executing the application information.

8. The method for receiving ESG data as claimed in claim 7, further comprising, when the decided application is not an executable application, informing that the content file cannot be executed.

* * * * *